Figure 1:
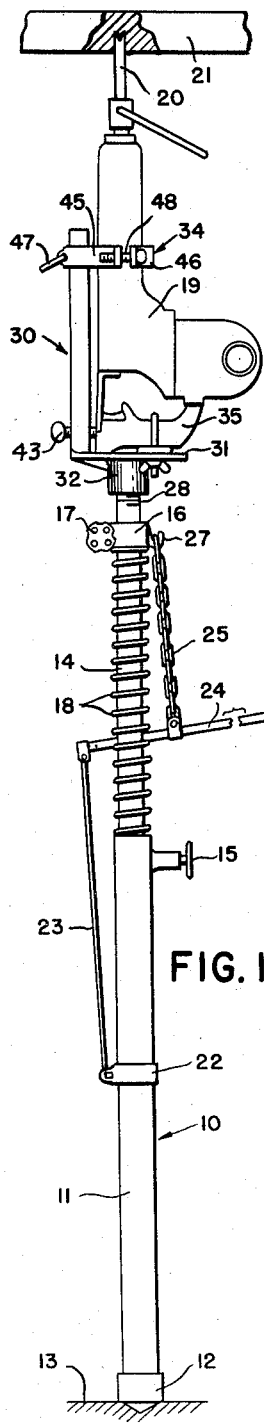

Aug. 2, 1960

A. J. PINE ET AL 2,947,204

UNIVERSAL POWER TOOL HOLDER FOR USE
WITH EXPANSIBLE SELF-FEEDING STRUTS

Filed Oct. 25, 1957

INVENTORS
Arthur J. Pine &
James F. Wagner

BY

*L. S. Saulsbury*

ATTORNEY

United States Patent Office 2,947,204
Patented Aug. 2, 1960

2,947,204

UNIVERSAL POWER TOOL HOLDER FOR USE WITH EXPANSIBLE SELF-FEEDING STRUTS

Arthur J. Pine, Lake Hiawatha, N.J. (138 Lexington Ave., New York 16, N.Y.), and James F. Wagner, 276 Beechwood Road, Oradell, N.J.

Filed Oct. 25, 1957, Ser. No. 692,393

1 Claim. (Cl. 77—7)

This invention relates to a universal power tool holder for use with expansible self-feeding struts.

It is the principal object of the present invention to provide a universal power tool holder for use with self-feeding adjustable struts which is so constructed as to be adaptable for holding and supporting any number of different types of air hammers, electric drills and the like power tools with the same holder and wherein the adjustment for the adaptation of the holder for the different types of hammers and drills can be easily and readily done.

It is another object of the invention to provide a power tool holder for self-feeding adjustable struts which has both horizontal and vertically adjustable clamps thereon that can be adjusted on the holder to accommodate the particular hammer or drill to be supported so that it may be properly centered with the axis of the strut and at the same time be adequately held in place upon the holder, wherein the vertically adjustable clamp is provided upon a single upstanding support arm in such a manner that while the adjustable clamp is vertically adjustable thereon it is positively locked against lateral displacement and the horizontal clamp be adaptable for adjustment on the supporting base of the holder for securement of the different handles of the different types of tools to the holder base.

It is still another object of the invention to provide in a power hammer or drill support, a centering screw disposed in the upstanding support arm adjacent the supporting base of the holder to fix the hammer of drill in its properly centered position upon the base of the holder and eliminate the need for recentering the tool and keeping the setting of the holder should a tool be temporarily removed therefrom.

It is a further object of the invention to provide an expansible self-feeding strut power tool holder that has a vertically-adjustable clamp in which an adapter is provided for use in the clamp so that the effective clamp center can be shifted and adapted for tools of different shank diameter.

Other objects of the invention are to provide an expansible self-feeding strut power tool holder, having the above objects in mind, which is of simple construction, has a minimum number of parts, inexpensive to manufacture, light in weight, durable, easy to connect to the strut, and adapted to the different hammer and drill tools, effective and efficient in use.

Figure 4:
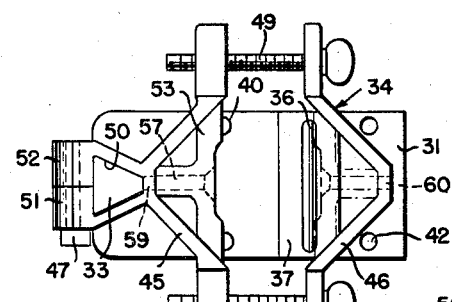
Figure 5:
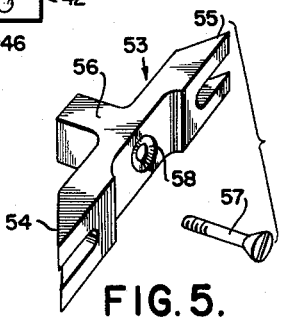
Figures 2, 3:
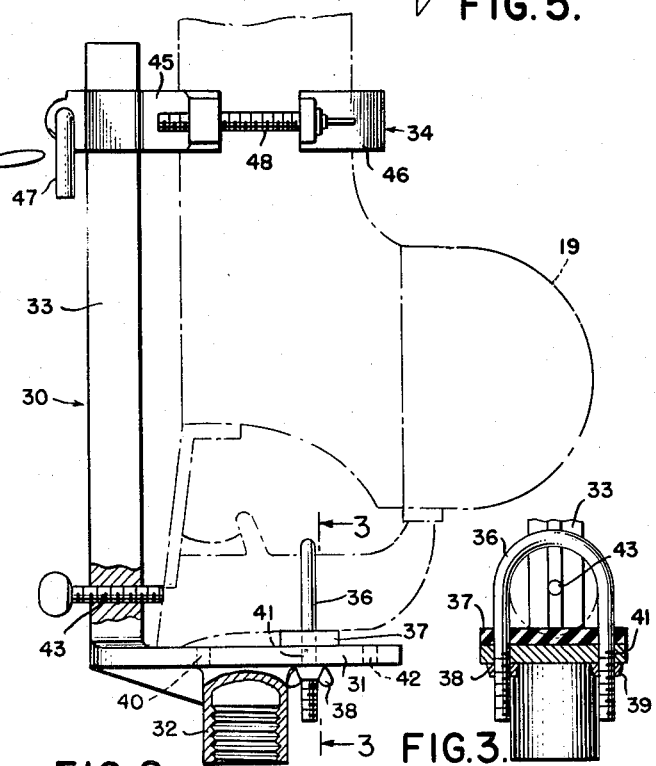

For a better understanding of the invention, reference may be had to the following detailed description taken in connection with the accompanying drawing, in which:

Figure 1 is a vertical elevational view of a self-feeding strut with the power tool holder of the present invention fixed thereto and containing a power hammer engageable with an elevated work piece, Fig. 2 is an enlarged elevational view of the power tool holder removed from the strut and with portions broken away to better show the construction thereof, Fig. 3 is a sectional view taken through the base of the holder and as viewed on line 3—3 of Fig. 2, Fig. 4 is a top plan view of the holder with one of the adapters in place in the vertically-adjustable clamp, and Fig. 5 is a perspective view of the clamp adapter.

Referring now to the figures, 10 represents an expansible self-feeding strut that has an outer sleeve 11 with a tapered foot piece 12 thereon for engagement with a ground or floor surface 13.

An inner telescoping member 14 is vertically slidable in the sleeve 11 and can be held fixed therein by a clamp screw 15. A clamp collar 16 having a clamp screw 17 can be adjusted on the central telescoping member 14 depending upon the amount of the inner member 14 needed to be extended. A compression spring 18 surrounds the inner member 14 and reacts between the upper end of the outer sleeve and the collar 11 to elevate the inner member automatically as a drilling operation is being performed with an electric hammer drill 19 having a drill element 20 thereon. A collar 22 is fixed to the sleeve 11 and a link 23 extends upwardly for connection with a hand lever 24 that is fulcrumed upon the lower end of a chain 25 suspended from a hook 27 on the collar 16. By depressing the lever 24 the central member 14 can be retracted into the sleeve 11 and the spring 18 compressed thereon by virtue of its abutment with the upper end of the sleeve 11 and the inner member held in its adjusted position by the collar clamp screw 17 until such time as it is to be released as when the drill element 20 is properly centered upon the work piece 21.

The upper end of the inner member 14 of the strut is threaded as indicated at 28 and to this upper end the universal tool holder 30 of the present invention is attached. This tool holder has a horizontal flat base 31 with a depending internally-threaded sleeve 32 secured thereto by which the holder is threaded upon the threads 28 and secured to the strut. The base 31 has an upstanding support arm 33 upon which a shank clamp 34 is adjustable. The support arm 33 is generally of triangular section so that the clamp device 34 is positively held against lateral displacement thereupon. The power tool 19 has a handle 35 by which it can be rested upon the top surface of the base 31 and through which a U-bolt 36 is extended. The tool handle 35 is rested upon a rubber mat 37 and is secured downwardly thereagainst by the thumb nuts 38 and 39. The opposite ends of the U-bolt may be extended through any one of laterally spaced pairs of holes 40, 41 and 42 in the base plate so that the U-bolt 36 can be given three different lateral positions upon the base plate 31 so that different tools having different types of handles can be accommodated.

In the upstanding support arm 33 adjacent to the base 31 is a thumb screw 43 which can be adjusted to hold the handle of the drill tool 19 against lateral displacement toward the arm 33 and to facilitate the centering of the power drill tool upon the base 31. The power drill tool 19 can be removed from the holder and readily replaced to the exact setting once the thumb screw has been adjusted.

The vertically adjustable clamp device 34 includes opposing V-shaped clamp parts 45 and 46. A holding screw 47 secures the clamp device 34 in its adjusted position on the upstanding support arm 33. Thumb screws 48 and 49 when tightened secure the shank of the drill tool within the clamp device 34.

The clamp part 45 has a triangular shaped opening 50 and slightly separable clamp portions 51 and 52 in which holding screw 47 is turned to tighten the two portions together to hold the clamp device 34 in its adjusted position upon the upstanding support arm 33. By having an adjustment of the clamp device 34 upon the upstanding support arm 33 the holder can be better adapted for the different length of shank portions of the different tools.

In order that the clamp device 34 can be adapted for the different types and sizes of tools and permit the tool to be centered with its bottom handle end, clamp inserts or adapters 53 can be disposed in either the clamp part 45 or 46 or in both so that by this means not only can the smaller diameter tools be held between the clamps but the centers of the tools can be adjusted and shifted laterally to provide for a proper vertical support of the tool so that the drill element 20 is aligned with the center of the strut. This adapter 53 has diverging end surfaces 54 and 55 that cooperate with the internal diverging surfaces of the clamp parts. A central enlargement 56 engages with the apex of the clamp part and is held in place thereat by a screw 57 that passes through a countersunk opening 58 and to a threaded hole 59 or 60 in either part 45 or part 46.

It should now be apparent that there has been provided a universal power tool holder for use with the expansible self-feeding struts which is adapted for the securement to the strut of any type or size of drill of electric hammers, drills or the like and which has provision for the proper assembling of the same in the holder regardless of the differences in shape.

While various changes may be made in the detail description, it shall be understood that such changes shall be within the spirit and scope of the present invention as defined by the appended claim.

What is claimed is:

A universal power tool holder adapted for use with an expansible self-feeding strut comprising a pair of members one telescoping in the other with a compression spring to urge the members for relative movement one within the other, a clamp collar on one of the members against which the spring abuts, a base on one of the members and having a strut attaching portion thereon, an upstanding support arm extending upwardly from one side of the base, said base being adapted to support the handle end of the tool, means on the base for releasably securing the handle to its upper surface thereof, a clamp device adjustable upon the upstanding support and adapted to be releasably secured to the shank of the tool, and said adjustable vertical clamp device formed of clamp parts with V-shaped openings and a clamp insert adapted to be located within the openings of either of the clamp parts, each of said clamp parts having a threaded screw hole, and a screw extended through the clamp insert and into the threaded opening of the clamp part for securing the clamp insert to the clamp part.

References Cited in the file of this patent

UNITED STATES PATENTS

| | | |
|---|---|---|
| 20,469 | Daggett | June 1, 1858 |
| 1,590,994 | Misener | June 29, 1926 |
| 2,038,422 | Decker | Apr. 21, 1936 |
| 2,405,110 | Bullock | Aug. 6, 1946 |
| 2,444,562 | Fried | July 6, 1948 |
| 2,672,770 | Buck | Mar. 23, 1954 |
| 2,720,125 | Palik | Oct. 11, 1955 |
| 2,749,780 | Jones | July 12, 1956 |